United States Patent [19]

Larsen

[11] Patent Number: 4,698,758
[45] Date of Patent: Oct. 6, 1987

[54] METHOD OF SELECTING AND REPRODUCING LANGUAGE CHARACTERS

[75] Inventor: Theodore E. Larsen, Edina, Minn.

[73] Assignee: Intech-Systems, Inc., Minneapolis, Minn.

[21] Appl. No.: 715,827

[22] Filed: Mar. 25, 1985

[51] Int. Cl.$^4$ .......................... G06F 15/38; B41J 5/00
[52] U.S. Cl. ..................................... 364/419; 400/110
[58] Field of Search ...................... 400/109, 110, 111; 364/419, 200, 900

[56] References Cited

U.S. PATENT DOCUMENTS

| | | | |
|---|---|---|---|
| 3,883,850 | 5/1975 | Martin et al. | 364/900 |
| 3,921,135 | 11/1975 | Komaru et al. | 340/756 X |
| 4,484,305 | 11/1984 | Ho | 400/110 X |
| 4,498,143 | 5/1985 | Stzelecki | 364/900 |
| 4,505,602 | 3/1985 | Wong | 400/110 |
| 4,545,023 | 10/1985 | Mizzi | 364/900 X |

FOREIGN PATENT DOCUMENTS

| | | | |
|---|---|---|---|
| 0158821 | 12/1979 | Japan | 364/419 |
| 0097636 | 7/1980 | Japan | 364/419 |
| 0091016 | 7/1980 | Japan | 364/419 |
| 0091015 | 7/1980 | Japan | 364/514 |
| 0020882 | 2/1982 | Japan | 364/419 |
| 0169618 | 10/1983 | Japan | 364/419 |

OTHER PUBLICATIONS

"Computerline", USA Today, Jul. 31, 1986, Money Section, This system will write in Chinese . . .

Primary Examiner—Jerry Smith
Assistant Examiner—Charles B. Meyer
Attorney, Agent, or Firm—Paul L. Sjoquist

[57] ABSTRACT

A method of selecting and reproducing language characters, preferably in languages having a multitude of pictorial characters, from phonetic or sound representation of the language, includes the steps of displaying the phonetic symbols which show all of the sounds of the language without intonations, selecting the desired sound for constructing a character, displaying all language characters having all intonations of the selected sound, and selecting the particular character having the unique phonetic sound and intonation combination, and the specific meaning intended.

21 Claims, 32 Drawing Figures

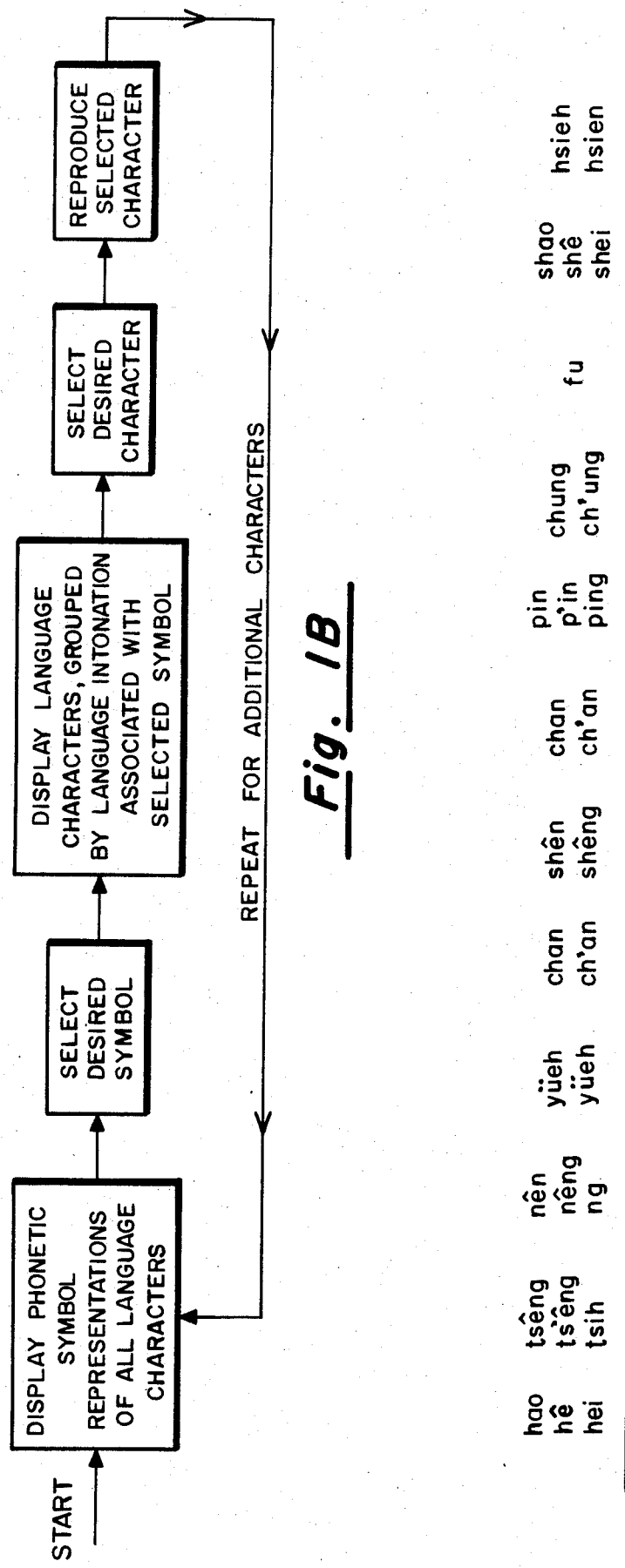

| a | chia ch'ia | chiün ch'iün | e | ha | i | ka | la |
|---|---|---|---|---|---|---|---|
| ai an | chiang ch'iang | chiung ch'iung | eh ei | hai han hang | ←50 | k'a kai k'ai | lai lan lang |
| ang ao | chiao ch'iao | chou ch'ou | ên erh | hao hê hei | jan | kan k'an kang | lao lê |
| | chieh ch'ieh | chu ch'u | | hên hêng hm | jang jao | k'ang kao k'ao | lei lêng |
| cha | chien ch'ien | chua ch'ua | fa | hou hsi | jê jên | kei kê kê | li |
| ch'a chai ch'ai | chih | chuai ch'uai | fan fang | hsia hsiang hsiao | jêng jih | kên kên keng | lia liang |
| chan ch'an ←90 | ch'ih | chuan ch'uan | fei fên | hsieh ←160 hsien | jou ju | keng kou k'ou | liao lieh |
| chang ch'ang | chin | chuang ch'uang | têng | hsin hsing hsiu | juan juei | ku k'u | lien lin |
| chao ch'ao | ch'in | chuei ch'uei | fo fou | hsiung hsü hsüan | jun jung | kua k'ua | ling liu |
| chê ch'ê | ching ching | chun ch'un | fu ←140 | hsueh hsun | juo | kuai k'uai | lou lu |
| chei chên ch'ên | chiu ch'iu | chung ch'ung ←130 | | hu hau huai | | kuan kuan kuang | lü luan |
| chêng ch'êng | chiü ch'iü | chuo ch'uo | | huan huang | | k'uang kuei k'uei | lüan lüeh |
| chi | chiüan ch'iüan | | | huei hun kung | | kun k'un kung | lun lung |
| ch'i | chiüeh ch'iüeh | | | hung huo | | k'ung kuo k'uo | luo |

*Fig. 3B-1*

| m | na | pa | sa | ta | ts'ang<br>tsao | wa | |
|---|---|---|---|---|---|---|---|
| ma<br>mai | nai<br>nan | p'a<br>pai<br>p'ai | sai<br>san<br>sang | t'a<br>tai<br>t'ai | ts'ao<br>tsê̂<br>ts'ê̂ | wai<br>wan<br>wang | , |
| man<br>mang | nang<br>nao | pan<br>p'an<br>pang | sao<br>sê<br>sên | tan<br>t'an | tsei<br>tsên<br>ts'ên | wei<br>wen | o |
| mao<br>mê | nê<br>nei | p'ang<br>pao<br>p'ao | seng<br>sha<br>shai | tang<br>t'ang | tsêng ←60<br>ts'êng<br>tsih | wêng<br>wo<br>wu | . |
| mei<br>mên | nên ←70<br>nêng<br>ng | pei<br>p'ei<br>pen | shan<br>shang | tao<br>t'ao | ts'ih<br>tsou<br>ts'ou | | ? |
| mêng<br>mi | ni<br>niang | p'ên<br>pêng<br>p'êng | shao ←130<br>shê<br>shei | tê<br>t'ê<br>tei | tsu<br>ts'u<br>tsuan | ya | ! |
| miao<br>mieh | niao<br>nieh | pi | shên ←100<br>shêng | têng<br>t'eng<br>ti | ts'uan<br>tsuei<br>ts'uei | yai<br>yang<br>yao | ( |
| mien<br>min | nien<br>nin | p'i<br>piao | shih<br>shou | t'i<br>tiao<br>t'iao | tsun<br>ts'un<br>tsung | yeh | ) |
| ming<br>miu | ning<br>niu<br>nou | p'iao<br>pieh | shu<br>shua | tieh<br>t'ieh<br>tien | ts'ung<br>tsuo<br>ts'uo | yen | ⌐<br>⌐ |
| mo<br>mou | nu<br>nü<br>nuan | p'ieh<br>pien<br>p'ien | shuai<br>shuan<br>shuang | t'ien<br>ting<br>t'ing | tu<br>t'u<br>tuan | yin<br>ying | ' |
| mu | nüeh<br>nung<br>nuo | pin<br>p'in ←<br>ping<br>120 | shuei<br>shun<br>shuo | tiu<br>tou<br>t'ou | t'uan<br>tuei<br>t'uei | yo<br>yu | ` |
| | | p'ing<br>po | sou<br>ssih | tsa<br>ts'a<br>tsai | tun<br>t'un | yü | " |
| o | p'o<br>p'ou<br>pu | su<br>suan<br>suei | ts'ai<br>tsan | tung<br>t'ung | yüan ←80<br>yüeh | " |
| | ou | p'u | sun<br>sung<br>suo | ts'an<br>tsang | tuo<br>t'uo | yün<br>yung | • |

| | shēn shen | chan ch'an | pin p'in ping | chung ch'ung | fu | shao she shei | hsieh hsien |
|---|---|---|---|---|---|---|---|
| shēn | 抆 伸 | | | | | | |
| | 子 鉮 | | | | | | |
| shén | 能 袗 | 呻 | 妊 | 審 | 珍 | | |
| shěn | 慇 哂 | | 嬸 瀋 | 審 | 哂 訟 | | |
| shèn | 站 慎 | | 渗 腎 | 甚 辰 | 誇 蜃 | | |
| shēng | 勝 牲 | 什 | 甥 | 101→ 生 | 甥 | 聲 | 甥 |
| shéng | 澠 | 繩 | | | | 陞 | |
| shěng | 省 | 渻 | | | | 聖 | 峰 |
| shèng | 剩 勝 | 乘 | 盛 | 聖 | 腾 | | |

|  | | pin<br>p'in<br>ping | chung<br>ch'ung | fu | shao<br>shê<br>shei | hsieh<br>hsien |
|---|---|---|---|---|---|---|
| 核 子 能 源 站 生 產 | | | | | | |

Pin⁻   傰 槟 欠 斌 㩧 䫉 頻 鑌 凾 賓 邠
Pin´   擯 殯 儐 髕 鬢

P'in⁻  姘 拚
P'in´  嬪 蘋 貧 频
P'in˅  ₚ 牝 聘
P'in`  DD

Ping⁻  兵 冰 忭 — 121
Ping˅  並 屏 丙 柄 炳 秉 窻 鉼 餅
Ping`  並 併 拼 琳 病 竝

| | | | | chung<br>ch'ung | lu | shao<br>she<br>shei | hsieh<br>hsien |
|---|---|---|---|---|---|---|---|
| 松 | 子 | 能 | 源 | 站 | 生 | 産 | 丙 |

Fig. 13B

| chung¯ | 中 | 忪 | 忠 | 終 | 冬 | 螽 | 鐘 |
|---|---|---|---|---|---|---|---|
| chungˇ | | 塚 | 尿 | 腫 | 踵 | 歃 | 鍾 |
| chung` | | 仲 | 中 | 種 | 眾 | 眾 | 重 |
| ch'ung¯ | | 忡 | 充 | 憧 | 沖 | 舂 | 衝 |
| ch'ung´ | 崇 | 艸 | 种 | 幢 | 蟲 | | |
| ch'ungˇ | 寵 | 籠 | | | | | |
| ch'ung` | 衝 | 銃 | | | | | |

| | | | | | | | shao shē shei | | | hsieh hsien | |
|---|---|---|---|---|---|---|---|---|---|---|---|
| 找 | 子 | 此 | 訊 | 原 | 站 | 生 | 產 | 內 | 種 | 輻 | |

| shao¯ | 弱 | 捎 | 梢 | 燒 | 稍 | 賞 | 搞 | 筲 | 艄 |
| shao´ | | 勺 | 芍 | 韶 | | | | | |
| shaoˇ | | 少 | | | | | | | |
| shaoˋ | 劭 | 哨 | 少 | 捎 | 綃 | 邵 | | | |
| shē¯ | 奢 | 賒 | 畬 | | | | | | |
| shē´ | 什 | 示 | 折 | 揲 | 基 | 舌 | 蛇 | 閣 | |
| sheˇ | 捨 | 舍 | | | | | | | |
| sheˋ | 射 ← 151 | 拾 | 攝 | 涉 | 社 | 舍 | 葉 | 設 | 赦 | 麝 | 射 |
| shei´ | 誰 | | | | | | | | |

METHOD OF SELECTING AND REPRODUCING LANGUAGE CHARACTERS

BACKGROUND OF THE INVENTION

The present invention relates to a method of constructing language symbols, and particularly to a method of identifying and reproducing language characters of the oriental languages.

Oriental languages are generally characterized in that they include an exceedingly large number of written characters, and in that the character representations are generally derived from or are pictorial representations representing entire words or phrases. For example, the Chinese language contains more than forty thousand distinct characters, of which approximately ten thousand characters can be regarded as significant from the point of view of common usage.

To the extent that the Chinese language has been mechanically reproduced in printed form, the machinery for achieving this reproduction has historically consisted of large mechanical machines which can print individual characters in columns and rows using fonts that are accessed from a large "keyboard". To accommodate all of the language characters a number of separate fonts must be used and must be interchangeable with each other on the machine for effecting the mechanical reproduction of characters.

With the advent of computer technology a variety of techniques have developed for electronically processing the Chinese language. In general these techniques have involved the use of more or less "standard" keyboards normally associated with computers. One technique involves assigning several identities to a number of different keys, and specific characters are accessed from memory by depressing individual keyboard keys in predetermined sequence. This provides coded instructions to the programmed logic regarding the specific character to be reproduced. Another technique utilizes Roman characters as the input to programmed logic, and yet another technique employs coding by numbers. These techniques are typified by the so-called cang jie method, the method of first/last stroke plus phonetic discriminator, the romaji conversion method, and the telegraphic code method.

Using the cang jie method, the operator must memorize the keyboard of the computer processor, including the cang jie representations of character fragments and must learn which keys each of the representations are on. Each key typically serves more than one cang jie symbol. When using the machine the operator mentally separates characters to be processed into their component fragments, and then obtains the desired character by pressing keys for cang jie equivalents of character fragments in the proper sequence, as though he were constructing the character by hand. The machine uses programmed logic to interpret the input key strokes and converts them to the desired characters. Selection by the machine of the proper character is facilitated by programmed grammar, and the operator reverts to use of a numerical code table if the cang jie form is unknown or is nonexistent.

The first/last stroke plus phonetic discriminator method requires that the operator memorize the computer processor keyboard, and in particular which strokes are available and which keys represent the strokes. Also, the operator must learn which phonetic symbols are available and which keys the phonetic symbols are associated with. When using the machine, the operator examines the characters to be processed, and identifies the first and last stroke making up each character. He then must know which characters can be distinguished on the basis of first and last stroke only, and which ones need a phonetic discriminator. The operator enters a character by pressing appropriate keys for the first and last stroke and the phonetic discriminator, if required, in the proper sequence. The computer processor uses programmed logic to interpret the input key strokes and converts them into a complete character. Selection of the proper character is facilitated by programmed grammar rules, and the operator reverts to use of the numerical code table if the strokes and phonetic symbols are insufficient for extracting the proper character from memory.

The romaji conversion method requires that the operator memorize both the romaji keyboard and the Romanized spelling for all of the sounds of the oriental language. For example, the Chinese language has 409 or 410 sounds. The People's Republic of China utilizes four hundred nine sounds in conversation, whereas the traditional Chinese language form used in Taiwan and elsewhere employs four hundred and ten sounds. When using a machine based on romaji conversion, the operator must examine the Chinese language document to be processed, mentally convert the written characters into sounds, convert those sounds into the romaji form, and then enter the romaji letters in proper sequence using an alphabetic or similar type of keyboard. The machine uses programmed logic to interpret the romaji letter sequences and convert them to the desired characters. Selection of the proper character is facilitated by programmed grammar rules, which is an essential part of romaji conversion using a keyboard input. The operator has no need for numerical code tables, since all characters can be expressed in romaji.

The numerical code method has been used for many years in the field of telegraphy. The operator must memorize code numbers for specific characters in order to achieve proficiency in the use of the technique, and those characters that are not memorized by the operator must be found using numerically coded tables. An input into a computer processor is made via numerical keys, and the processor uses programmed logic to interpret the input key strokes and convert them to characters.

In the transition from mechanical "typewriters" to electronic character processors, some use has been made of what is generally called the tablet/stylus technique. This consists of a tablet with a fixed display of commonly used characters on its surface, and a stylus for identifying the location of desire characters. It has the advantage over the old Chinese mechanical typewriter in that it is smaller in size, but the number of characters displayed is limited by the physical size of the tablet, and the physical size of the tablet in turn is limited by how many characters can be usefully displayed without completely confusing the operator. An electronic stylus is used in place of a mechanical positioning device, and it provides an electrical signal that identifies X-Y coordinates on the tablet to the computer.

Several of the methods described above employ programmed grammar rules, either as an essential element or as an important aid for facilitating character selection. This is a major shortcoming of keyboard operated processors for the Chinese, Japanese or Korean languages, because programmed grammar rules cannot accommodate jargon unless specifically programmed. Jargon is defined as the body of colloquial expressions which have come into practice as languages have evolved and which may vary in meaning from one segment of society to another. Machines will obey rigid rules of grammar, but people generally do not. Jargon is widely used in every field from computers to medicine, and varies from one region to another even within a single country. A machine which is dependent upon use of proper grammar for efficient operation can be nearly paralyzed by jargon. Stated another way, the preparation of documents in any specialized field where jargon is essential to communications will significantly reduce operator efficiency.

The romaji conversion method described above depends upon programmed grammar rules, and so is intolerant of jargon. Even more important, however, is the fact that message distortion will usually result from typographical errors caused when the romaji conversion method is used. A machine operator working in the English language can and will make typographical errors, but this does not usually destroy the sense of what is being communicated. With romaji conversion processing of the Chinese language however, a typographical error can change the meaning of a word dramatically. For example, an operator intending to type the romaji form "hezi" could easily strike the wrong one of two adjacent keys, producing the Chinese character form of "gezi" and changing the intended meaning while still retaining grammatical continuity. The word "hezi" has reference to a nuclear device, whereas "gezi" relates to a dove, the symbol of peace.

From the above summary of existing language processing methods it is evident that computer processing can and has been used to enhance the practice of these methods. Because of the unique speed capabilities of computers, they are a valuable tool in facilitating the selection and reproduction process of constructing oriental characters because they can very rapidly apply a large number of known and predetermined rules to this process, and can store a large volume of character-related information. Through the use of modern matrix type printers and CRT display screens, the outputs of these devices can be used to reproduce a hard copy of pictorial symbols, or the output can be used as a character generator for word processors or computers. A conventional input device to a computer processing system is a keyboard, which is a severe handicap when dealing in a language having thousands of characters because the number of characters greatly exceeds the practical limit for keyboard size. To address this problem the present invention contemplates a method which most effectively works with a dynamic "keyboard" wherein the identity of the respective "keys" is a dynamic function of the respective method steps being performed at the moment.

Whereas the steps of the method can be performed utilizing a wide variety of machine and/or non-machine constructions, they are most efficiently performed in combination with a machine having a cathode ray tube (CRT) utilizing a touch screen construction for interfacing with a computer processor. The advantage of a touch screen device for use in performing the method is that the user/machine interface is achieved by touching the various X-Y coordinate positions physically fixed on the screen, whereas the visual display shown on the screen may be selectively manipulated to place different character options at the various X-Y intersections. Therefore, depending upon which of the method steps is being performed at any instance, the screen display may indicate a plurality of character choices and the operator may touch the X-Y coordinate corresponding to one of these choices to initiate the next step of the language processing method. In this manner, the finite area of a touch screen may take on many different meanings in the course of performing a multi-step method but each display associated with any particular step may contain only a finite and readily understandable body of character information for consideration by the operator. When used in conjunction with a phonetic approach to language construction all of the character options for sounds being processed may be displayed, thus accommodating even the most specialized topic, jargon or slang. Further, the use of a phonetic approach to the generation of language characters also enables the use of voice recognition techniques for processing phonetic sounds, which can greatly speed up the computerized practice of the method.

SUMMARY OF THE INVENTION

The invention comprises a method of generating characters and constructing sentences in any language which utilizes pictorial characters, and especially in languages wherein the number of character options is extremely large. The method is most preferably practiced utilizing a computer processor and associated computer peripheral equipment, but may be practiced with other machines or without machine assistance at all. The method is best described in connection with computer processing equipment, and in that regard comprises the steps of displaying the phonetic symbols which represent all sounds of a language, selecting the desired sounds for constructing a word or sentence, displaying all of the character options for all of the intonations of the first selected sound, selecting one or more of the character options corresponding to the precise meaning intended, and repeating the steps until the desired sentence has been constructed. In connection with a computer processor the invention also contemplates the steps of retrieving and storing in memory, visually displaying and printing, as well as other intermediate steps which may be required in a computer processing environment.

It is a principal object of the present invention to provide a method of rapidly and efficiently constructing a sentence or sentences in a pictorial language, including the reproduction of the characters of the language.

It is another object of the invention to provide a method for reproducing a language in pictorial symbols from a phonetic-based input.

It is a further object of the present invention to provide printed language reproduction in the Chinese, Japanese and other oriental languages.

Another object of the present invention is to provide a method for language processing utilizing commercially available computer products and accessories.

BRIEF DESCRIPTION OF THE DRAWINGS

The foregoing and other objects and advantages will become apparent from the following specification and claims, and with reference to the appended drawings, in which:

FIG. 1B illustrates the method;

FIG. 3A shows an example of phonetic construction of a sentence in the Chinese language, in traditional Romanized form;

FIGS. 3B-1 and 3B-2 show a Romanized phonetic table of the Chinese language;

FIG. 4A shows a phonetic table of a Chinese language, in abbreviated form;

FIG. 5A shows the phonetic sentence of FIG. 3A;

FIG. 5B shows the Chinese character options for the first group of phonetic symbols of FIG. 5A;

FIG. 6A shows a phonetic sentence having partial Chinese character construction;

FIG. 6B shows the Chinese character options for another of the phonetic representations of FIG. 6A;

FIG. 7A shows a further partial Chinese character sentence structure;

FIG. 7B shows the Chinese character options for a further phonetic representation of FIG. 7A;

FIG. 8A shows the further partial Chinese character sentence structure;

FIG. 8B shows the Chinese character options for a further phonetic representation of FIG. 8A;

FIG. 9A shows a further partial Chinese character sentence structure;

FIG. 9B shows the Chinese character options for a further phonetic representation of FIG. 9A;

FIG. 10A shows a further partial Chinese character sentence structure;

FIG. 10B shows the Chinese character options for a further phonetic representation of FIG. 10A;

FIG. 11A shows a further partial Chinese character sentence structure;

FIG. 11B shows the Chinese character options for a further phonetic representation of FIG. 11A;

FIG. 12A shows a further partial Chinese character sentence structure;

FIG. 12B shows the Chinese character options for a further phonetic representation of FIG. 12A;

FIG. 13A shows a further partial Chinese character sentence structure;

FIG. 13B shows the Chinese character options for a further phonetic representation of FIG. 13A;

FIG. 14A shows a further partial Chinese character sentence structure;

FIG. 14B shows the Chinese character options for a further phonetic representation of FIG. 14A;

FIG. 15A shows a further partial Chinese character sentence structure;

FIG. 15B shows the Chinese character options for a further phonetic representation of FIG. 15A;

FIG. 16A shows a further partial Chinese character sentence structure; and

FIG. 16B shows the Chinese character options for the final phonetic representation of FIG. 16A.

DESCRIPTION OF THE PREFERRED EMBODIMENT

Figure 1A:
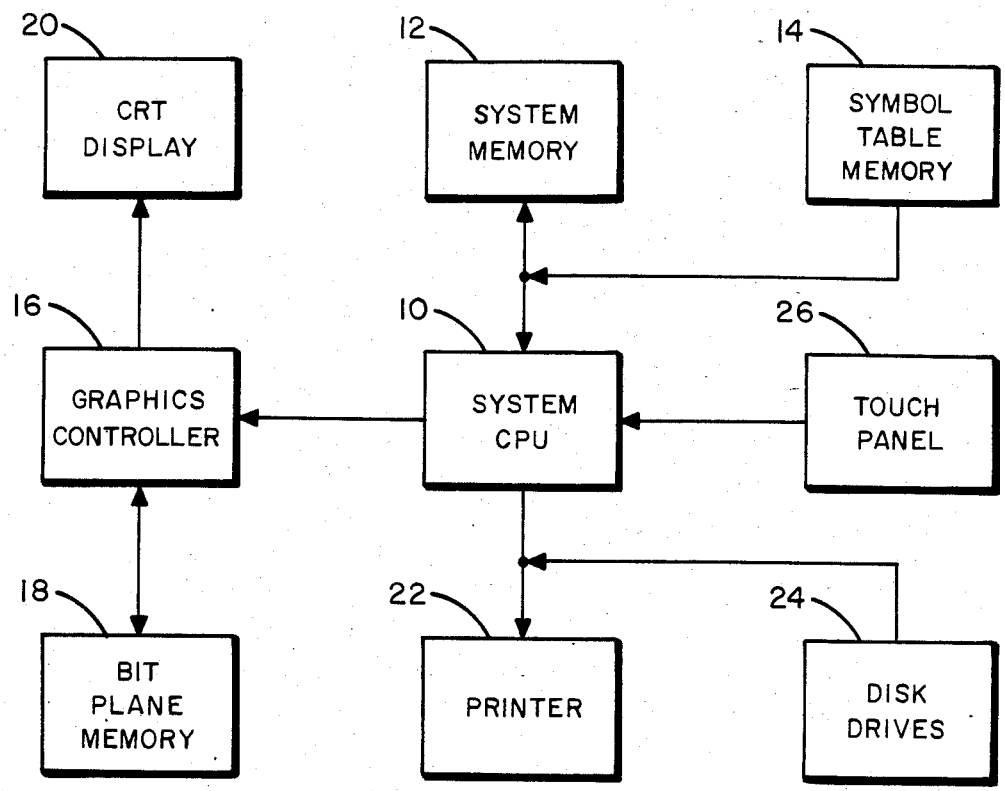
FIG. 1A shows a simplified block diagram of a machine for performing the method.

Referring first to FIG. 1A, a computer processing system for implementing the method described herein is shown in block diagram form. The system of FIG. 1A is configured with commercially available components, and interconnections between the respective components are all made with well-known and commercially available techniques. The system computer processing unit (CPU) 10 is of standard construction and design, having therein approximately seven hundred and fifty kilobytes of read only memory (ROM) for each ten thousand pictorial characters which are to be operated on by the system. The system CPU 10 also has standard interconnectability to the various other components shown in FIG. 1A, and is capable of operating on the software which may be stored in a system memory 12. All of the pictorial characters may be represented in binary code form, and stored in a symbol table memory 14. These characters may be recalled from symbol table memory 14 in any order by CPU 10 and may be transferred by CPU 10 to the other components of the system. For example, CPU 10 may transfer information to the graphics controller 16 which may have associated therewith a bit plane memory 18 for storing the entire graphic information required for one screen display. Graphics controller 16 drives a cathode ray tube (CRT) display 20 by transmitting binary information in a predetermined sequence to CRT display 20, causing such information to become displayed on the visual screen associated with CRT display 20 in any preferable form.

System CPU 10 is operatively connected to a printer 22, which preferably is a "matrix" type printer or equivalent, capable of printing characters of sufficiently high resolution so as to enable a reader to discriminate between the many different, but similar characters which might be selected. It is preferable that printer 22 has the capability of printing character symbols in 24×24 dot matrix patterns, for it has been found that this pattern provides sufficient resolution for the most complex pictorial characters likely to be encountered in performing the method. A disk drive 24, or plurality of disk drives may be utilized by the system for mass storage of software and character sets. A touch panel 26 is fitted over the CRT display screen, and wired to CPU 10 to provide X-Y coordinate signals to CPU 10 whenever any point on the touch panel 26 is touched by an operator.

Figure 2:
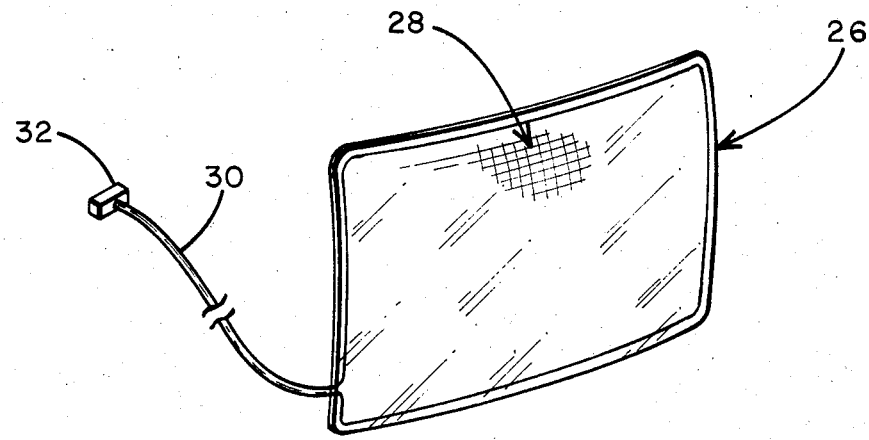
FIG. 2 shows a touch sensitive panel adapted for use with the apparatus of FIG. 1A.

FIG. 2 shows a diagrammatic view of touch panel 26, illustrating that it is formed for close fitting against the CRT display screen. Touch panel 26 is constructed of transparent material across its face, having conductive surfaces connected to a cable 30 which terminates in a plug 32, and plug 32 may be directly connected to system CPU 10. Touch panel 26 operates to generate a unique electrical signal whenever any intersecting coordinate of a row or column sensor 28 is touched by an operator. Touch panel 26 may have an intersecting matrix of 16×16 interconnecting points for resolving X-Y coordinate positions on the screen, or may employ a voltage divider arrangement operating through an analog to digital converter to provide 50,000 or more X-Y coordinate positions. Graphics controller 16 is designed so as to display characters on CRT display 20 and X-Y coordinate position corresponding to the intersecting coordinates of sensors of touch panel 26.

The system software is programmed so as to provide appropriate cues to the operator through menus displayed on the CRT screen, and is dependent upon the operator's intellect to choose each successive step in the process. No programmed grammar is required, and thus the machine has no limitations in the use of operator jargon. System CPU 10 is a menu driven processor that can retain the basic operator interface information under all operating conditions.

Referring next to FIG. 3A, an example is given of the phonetic construction of a particular sentence to be formed in traditional Chinese characters, such as used in Taiwan. The particular sentence chosen as an example for illustrating the steps involved in the method is the sentence "nuclear power stations generate gamma radiation". In translating this English language sentence into Chinese, an operator would select the sounds he, tsih, neng, yuan, chan, sheng, chan, ping, chung, fu, she, and hsien. Each of these sounds is shown in the respective groupings of FIG. 3A, and the groupings are associated with respective groupings of FIG. 3B.

FIGS. 3B-1 and 3B-2 show a phonetic table in Chinese, wherein all phonetic sounds are represented in Roman characters. The phonetic sounds are arranged alphabetically by column and row, and each of the above identified Chinese sounds may be found in FIGS. 3B-1 and 3B-2, either alone or in combination with similar Chinese sounds in the same grouping.

The present method can be practiced in any of several forms, each of which may differ from the other forms in respect to specific implementation steps, but all of which achieve the same desired end result. Two such forms of practicing the detailed implementation steps will be described herein to more fully illustrate the method, and other equivalent implementation steps may be developed.

In a first form of implementing the method the operator scans the phonetic table of FIGS. 3B-1 and 3B-2 to locate the first phonetic sound he wishes to use in constructing the desired sentence. After locating that desired phonetic sound, he depresses the touch screen at the grouping which includes the desired sound. This causes a signal to be generated by touch panel 26, which signal is transmitted to system CPU 10, and the internal programmed logic of CPU 10 causes activation of the symbol table memory 14. Selected information from symbol table memory 14 is then transmitted to graphics controller 16 for causing CRT display 20 to display the desired images corresponding to this information.

Using the example chosen for illustrating the method, and as an example of a first implementation form of the method, the operator finds the "he" sound in the phonetic table of FIG. 3B (which may be displayed on CRT display 20) at location 50. He selects the sound by depressing the touch panel 26 at location 50 and this action causes a further display to be presented on CRT display 20; specifically, the first grouping on the left of FIG. 3A. For purposes of describing this implementation form of the method, it may be presumed that the illustration of FIGS. 3A and 3B-1 and 3B-2 are displayed on the CRT dislay 20 at the same time, with the groupings shown in FIG. 3A selectively developed and displayed according to the implementation steps described herein. Initially, the space on CRT display 20 which is occupied by the groupings shown in FIG. 3A is blank, and each of the groupings is added through successive implementation steps, the first of which provides the first grouping on the left of FIG. 3A.

The operator then selects the next desired phonetic sound from the table display of FIGS. 3B-1 and 3B-2, which is "tsih". He finds the phonetic sound "tsih" at location 60 of the phonetic table and selects the phonetic grouping at this location by depressing touch panel 26 at location 60. This causes the addition of a further display grouping in FIG. 3A, namely the second grouping from the left which includes the sound "tsih". The operator next locates the desired phonetic sound "neng" on the display illustrated by FIGS. 3B-2, at location 70, and depresses the touch panel 26 at location 70 to further add to the groupings displayed in FIGS. 3B-1 and 3B-2. In particular, the grouping which is shown third from the left in FIG. 3A is added, which includes the phonetic sound "neng".

The operator continues this process, next selecting the desired phonetic sound "yuan", which is found at location 80 of FIG. 3B-2, and depressing the touch panel 26 at location 80 causes a further display of the grouping on FIG. 3A which includes the phonetic sound "yuan".

The operator next locates the desired phonetic sound "chan", which he finds at location 90 of FIG. 3B-1 and repeats the process previously described to add the display of this grouping to FIG. 3A at the fifth grouping position from the left.

The operator repeats this process for the phonetic sound "sheng" which he finds at location 100 of the phonetic table of FIG. 3B-1, and this is further displayed as the sixth grouping from the left in FIG. 3A.

Repeating these implementation steps for the remaining phonetic sounds "chan", "ping", "chung", "fu", "she", and "hsien", the seventh through twelfth grouping positions of FIG. 3A may be displayed.

When the entire display of FIG. 3A has been completed according to the above implementation steps, all sounds pertinent to the sentence "nuclear power stations generate gamma radiation" will appear in proper order on the CRT display screen 20, in the order as shown in FIG. 3A. The operator must next select the appropriate Chinese characters relating to these sounds in order to convey specifically the meaning that is intended. Since each sound has a number of different characters associated with it, and since each character has a distinctly different meaning, the operator is next given access to all pertinent character options by activating a particular signal to system CPU 10. This activation signal may be accomplished by a switch selection, or by depressing a particular location on touch panel 26, or by some other programmed arrangement. When implemented, this action initiates a sequential display of screens, the sequence being dictated by the order of the sound groupings shown in FIG. 3A.

Figures 5A, 5B:
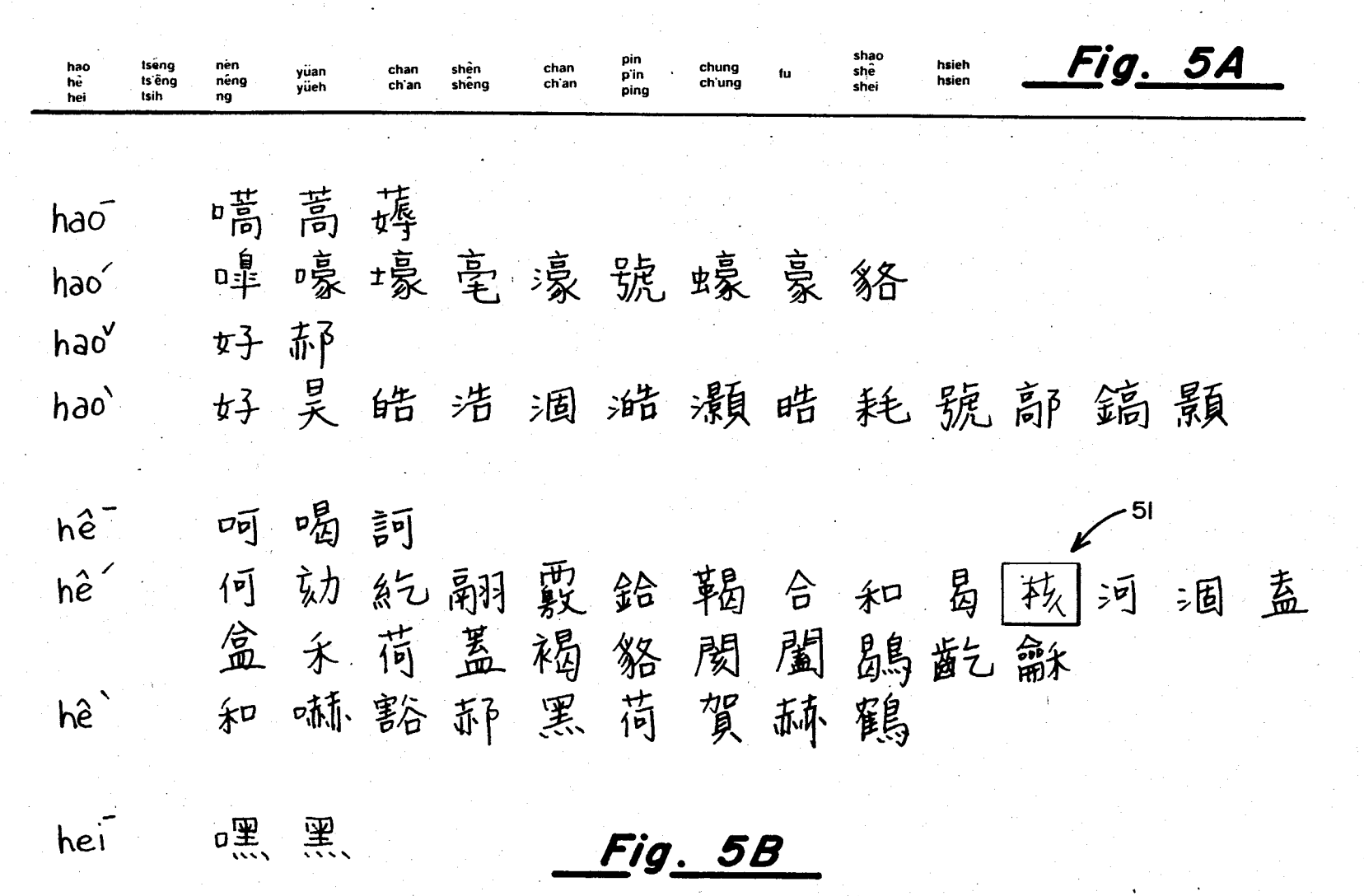
Figures 6A, 6B:
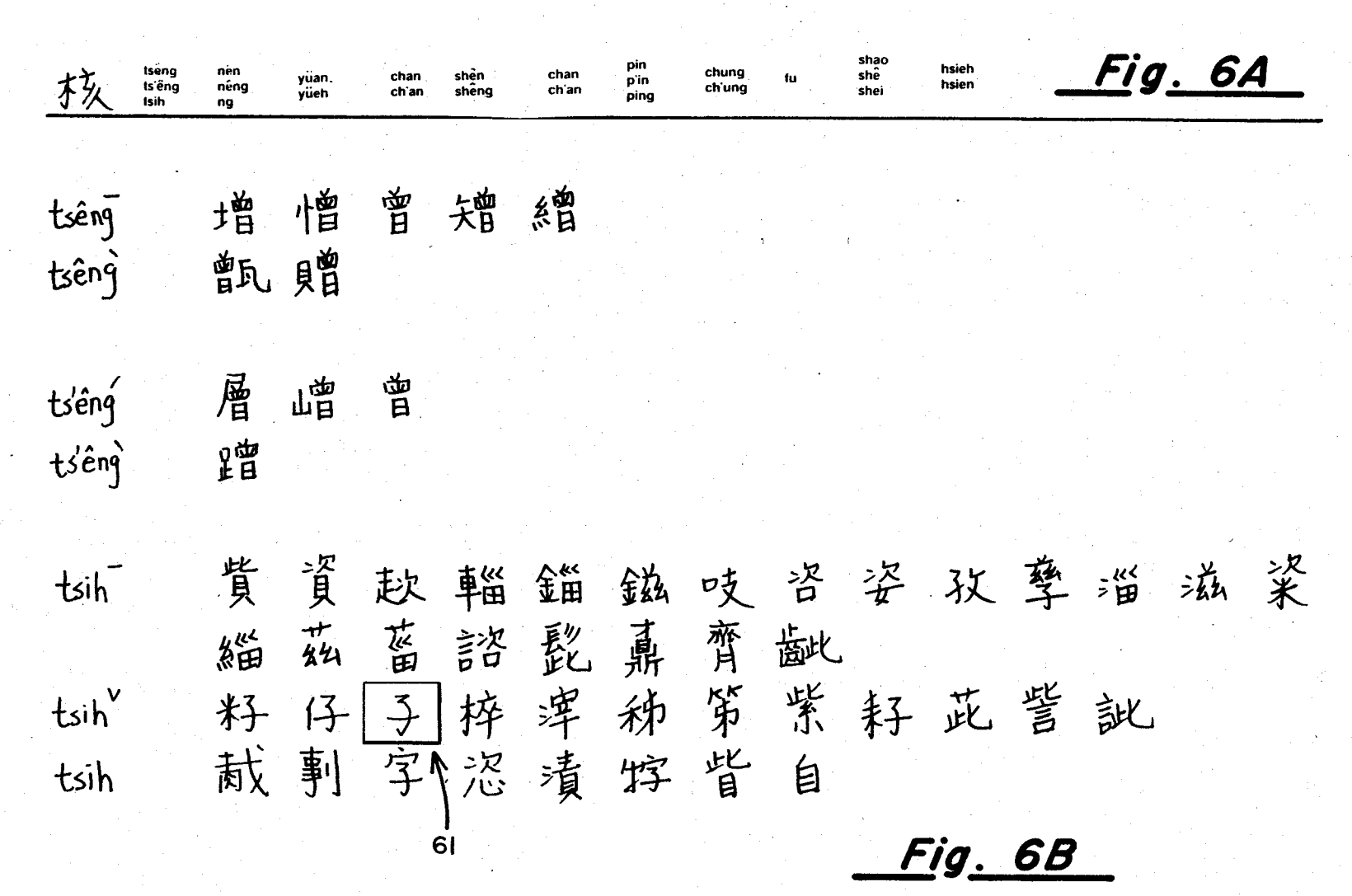

The display of all sound intonations and character options for the first grouping on the left in FIG. 3A is produced by the signal activation described above, and FIG. 5B illustrates the appropriate display for this first sound grouping. Included in the table of FIG. 5B are three different intonations of the "hen" phonetic sound and each of the intonations has a plurality of Chinese characters associated therewith. The Chinese character corresponding to the word "nuclear", or part thereof, is found at location 51, and the operator therefore depresses the touch panel 26 at location 51. This action causes the first grouping of phonetic sounds shown in FIG. 3A (and repeated in FIG. 5A) to become modified, by substituting the Chinese character at location 51 into the position previously occupied by the first grouping of phonetic characters. This substitution is illustrated in FIG. 6A.

Figures 7A, 7B:
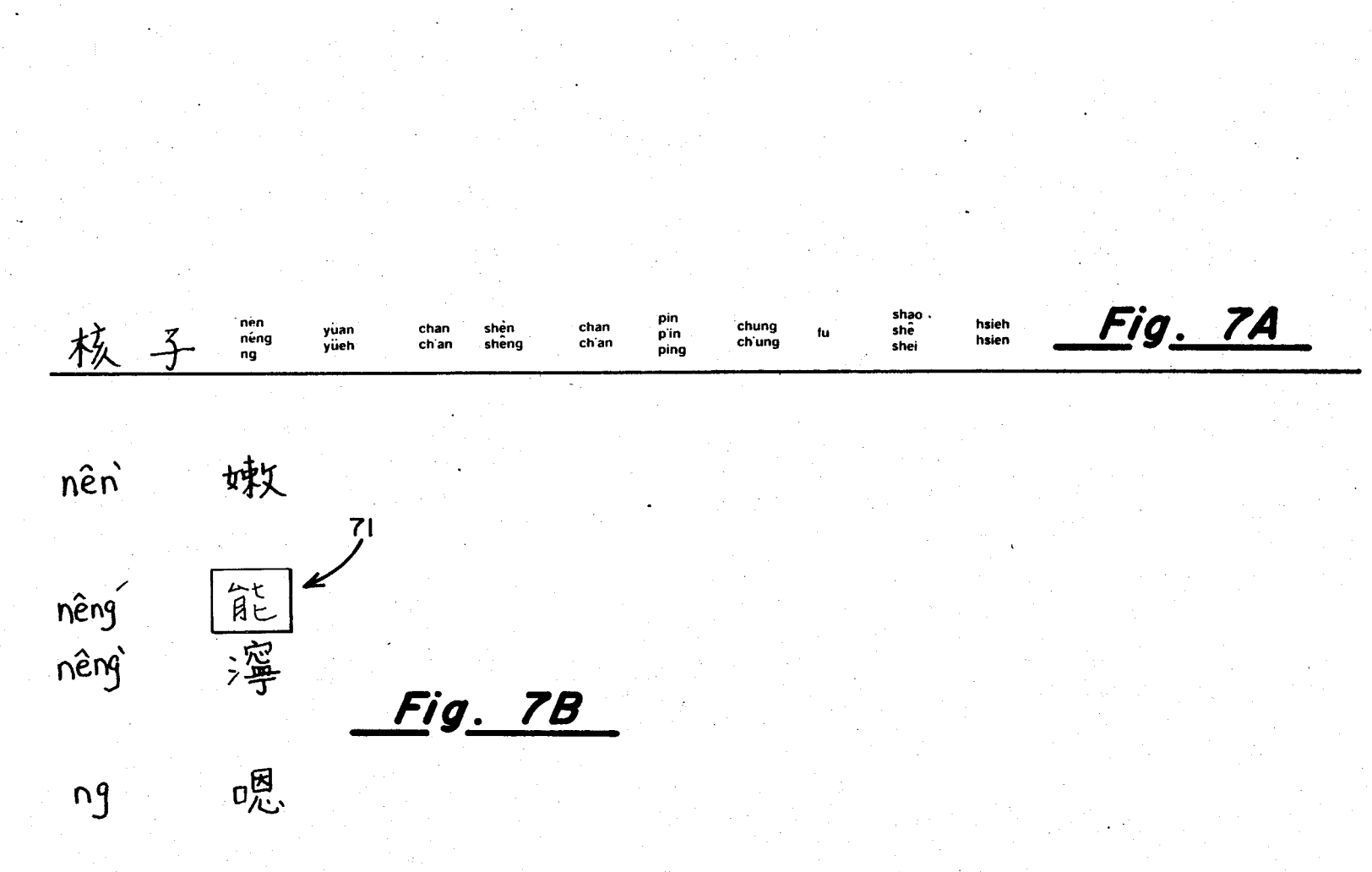

Next, the phonetic sounds in the second grouping of FIG. 3A are utilized through the signaling techniques described hereinabove to activate a further display screen (FIG. 6B) containing these phonetic sounds, together with all of their intonations, and including all of the Chinese characters associated with each of the intonations. The operator selects the Chinese character at location 61 of FIG. 6B, as having the appropriate meaning for the sentence under construction. The operator depresses the touch panel at location 61 and thereby causes the Chinese character at location 61 to become substituted for the phonetic grouping from which it was derived. This substitution is shown in FIG. 7A.

Next, a further signal activation causes the third phonetic sound grouping of FIG. 3A to become displayed (FIG. 7B), including all of the intonations of the phonetic sounds grouped therein. After inspection, the operator selects the proper character for the sentence he is constructing, which is found at location 71 of FIG. 7B, and he depresses the touch panel 26 at location 71 to cause the selected Chinese character to become substituted for the phonetic symbol grouping, as shown in FIG. 8A.

Figures 8A, 8B:
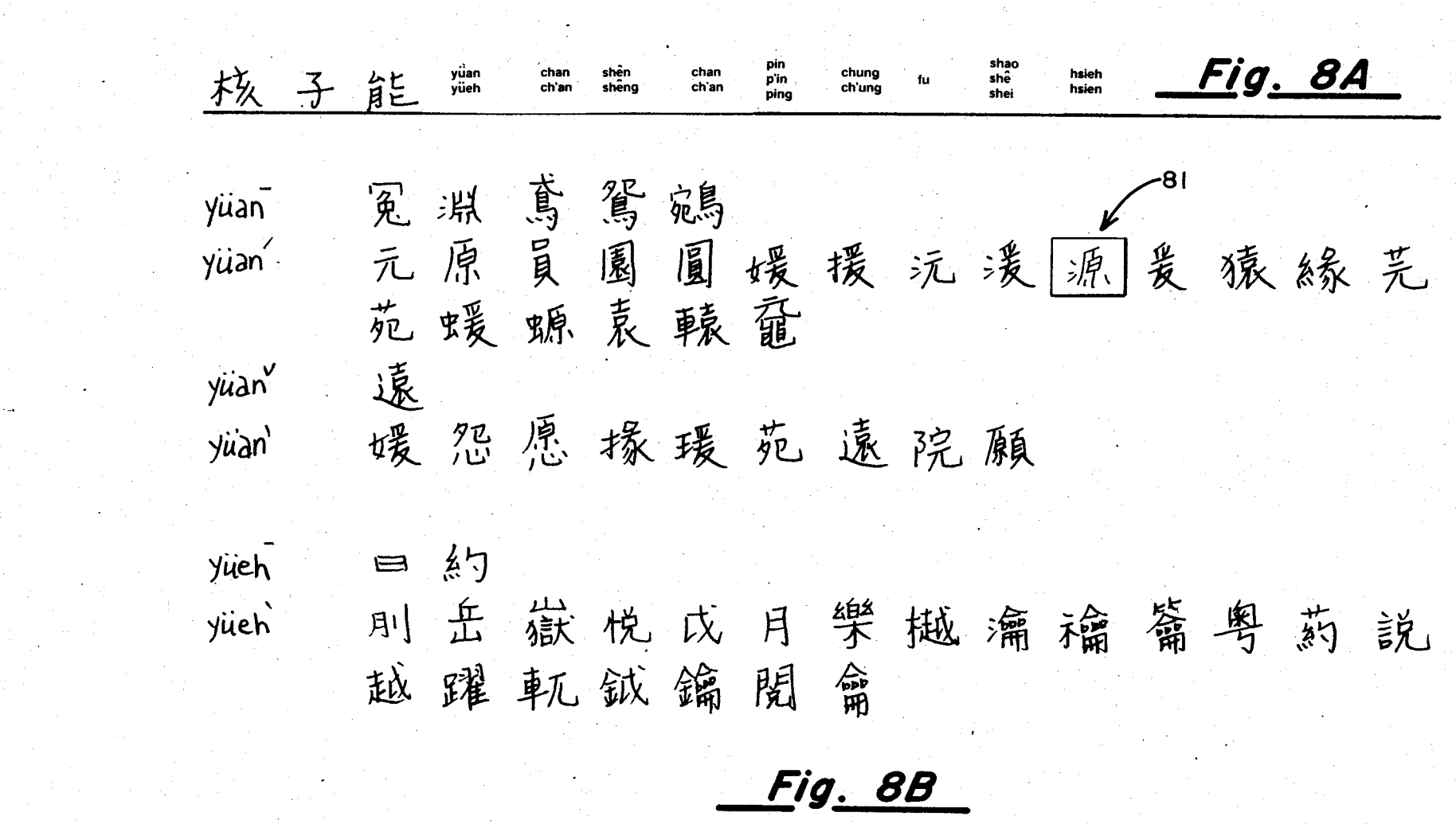
Figures 9A, 9B:
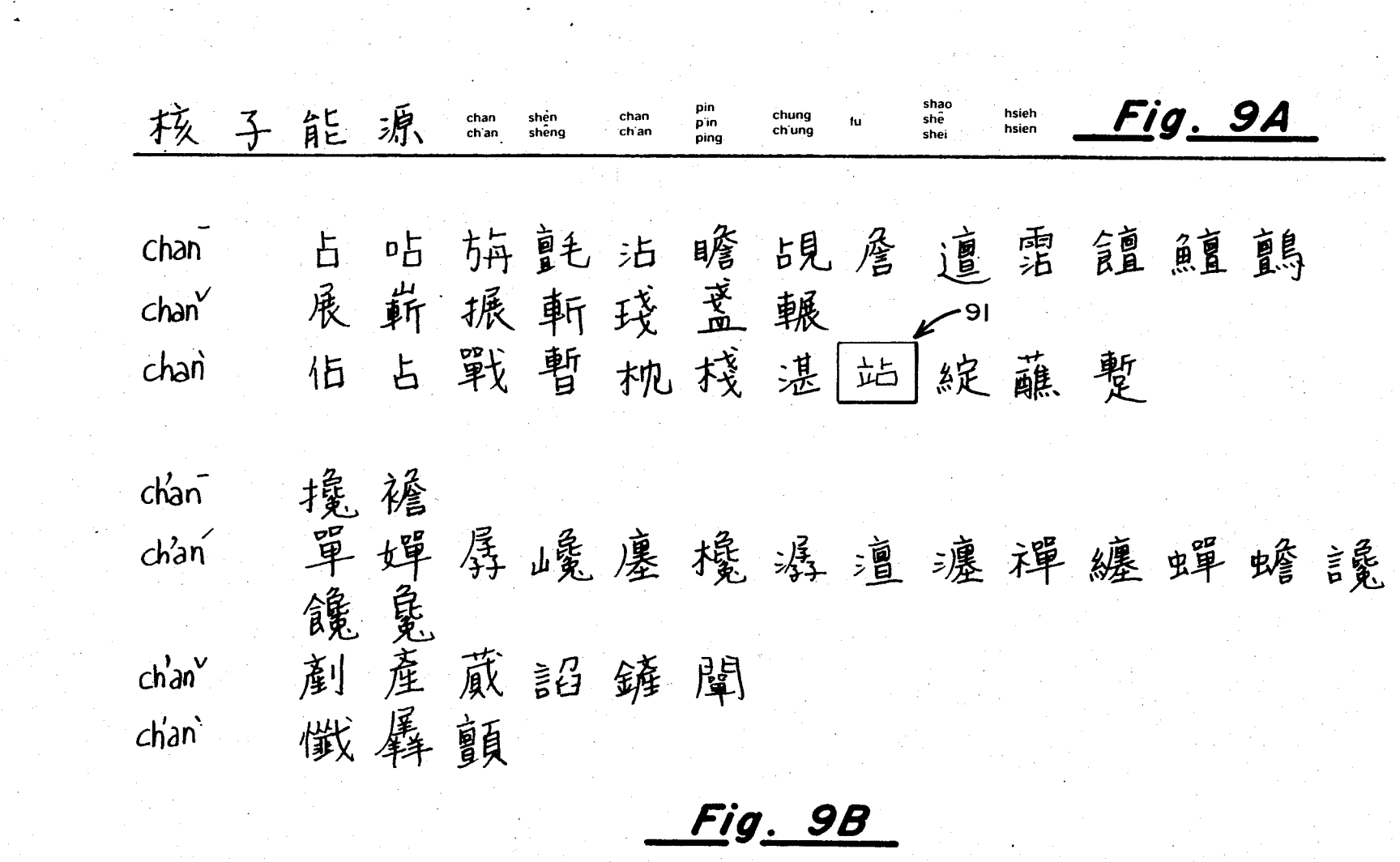

Next, a further display is presented, as shown in FIG. 8B, which contains all of the intonations of the next grouping of phonetic sounds of FIG. 3A. The operator reviews the intonations of these phonetic sounds as displayed in FIG. 8B, and selects the Chinese character appropriate to the sentence he is constructing, which is found at location 81 on FIG. 8B. Depressing the touch panel 26 at location 81 causes the Chinese character at location 81 to become substituted for the previously displayed phonetic sounds, as is shown in FIG. 9A. This process is continued until all phonetic sound groupings of FIG. 3A are replaced by Chinese characters.

According to the practice of the method in a slightly different form, an operator will scan the phonetic table of FIG. 3B to locate the first phonetic sound he wishes to use in constructing the desired sentence. After locating the desired phonetic sound he depresses the touch screen at the grouping which includes the desired sound. In the example chosen for illustrating the method, the first phonetic sound required for the construction of the sentence "nuclear power stations generate gamma radiation" is the phonetic sound "he". Accordingly, the operator finds the "he" sound in the phonetic table of FIG. 3B (which may be displayed on CRT display 20) at location 50. He selects the sound by depressing the touch panel 26 at location 50 and this action causes a further display to be presented on CRT display 20. The further display is shown in FIG. 5A, which is a table of the Chinese characters which correspond to each of the phonetic sounds previously located at location 50. Included in this table are three different intonations of the "he" phonetic sounds and each of the intonations has a plurality of Chinese characters associated therewith. The Chinese character corresponding to the word "nuclear", or part thereof, is found at location 51, and the operator therefore depresses the touch panel 26 at location 51. This action causes the first grouping of phonetic sounds shown in FIG. 5A to become modified, by substituting the Chinese character at location 51 into the position previously occupied by the first grouping of phonetic characters as is shown in FIG. 6A.

The operator then returns to the phonetic table of FIG. 3B to select the next phonetic sound, which is "tsih". He finds the phonetic sound "tsih" at location 60 of the phonetic table and selects the phonetic grouping at this location by depressing touch panel 26 at location 60. This activates a further display screen (FIG. 6B) containing the phonetic sounds at location 60, together with all of their intonations, and includes all of the Chinese characters associated with each of the intonations. The operator selects the Chinese character at location 61, as having the appropriate meaning for the sentence under construction. The operator depresses the touch panel at location 61, and thereby causes the Chinese character at location 61 to become substituted for the phonetic grouping as shown in FIG. 7A.

He next returns to the phonetic table of FIG. 3B and locates the next phonetic sound "neng". This sound is found at location 70, and depressing touch panel 26 at location 70 results in the display of FIG. 7B, which includes all the intonations of the phonetic sound grouped at location 70. After inspection, the operator selects the proper character for the sentence he is constructing, which is found at location 71 of FIG. 7B, and depressing the touch panel 26 at this location results in the Chinese character at location 71 of FIG. 7B to become substituted for the phonetic symbols previously considered, as shown in FIG. 8A.

The operator again returns to the phonetic table of FIG. 3B to select the next phonetic sound "yuan", which is found at location 80 of FIG. 3B. Depressing the touch panel 26 at location 80 causes the display of FIG. 8B to be presented, which contains all of the intonations of the phonetic sounds of location 80. The operator reviews the intonations of these phonetic sounds as displayed in FIG. 8B, and selects the Chinese character appropriate to the sentence he is constructing, which is found at location 81 on FIG. 8B. Depressing the touch panel 26 at location 81 causes the Chinese character at location 81 to become substituted for the previously displayed phonetic sounds, as is shown in FIG. 9A.

The operator again returns to the phonetic table of FIG. 3B to locate the next phonetic sound "chan", which he finds at location 90 of FIG. 3B. Repeating the process previously described, the operator is presented with the intonations of all of the phonetic sounds at location 90, as is shown in FIG. 9B, and selects the desired character at location 91. The character at location 91 becomes substituted for the previous phonetic sound as shown in FIG. 10A.

The operator repeats this process for the phonetic sound "sheng" which he finds at location 100 of the phonetic table of FIG. 3B, and intonations of these phonetic sounds as shown in FIG. 10B reveal the desired character located at location 101 of FIG. 10B. This character is moved into position and substituted for the phonetic sounds, as is shown in FIG. 11A.

Repeating these process steps for the remaining phonetic sounds "chan", "ping", "chung", "fu", "she", and "hsien", the locations of these phonetic sounds, their respective intonations, and the selected Chinese characters may be found according to the following table which summarizes the process selection steps.

Figures 11A, 11B:
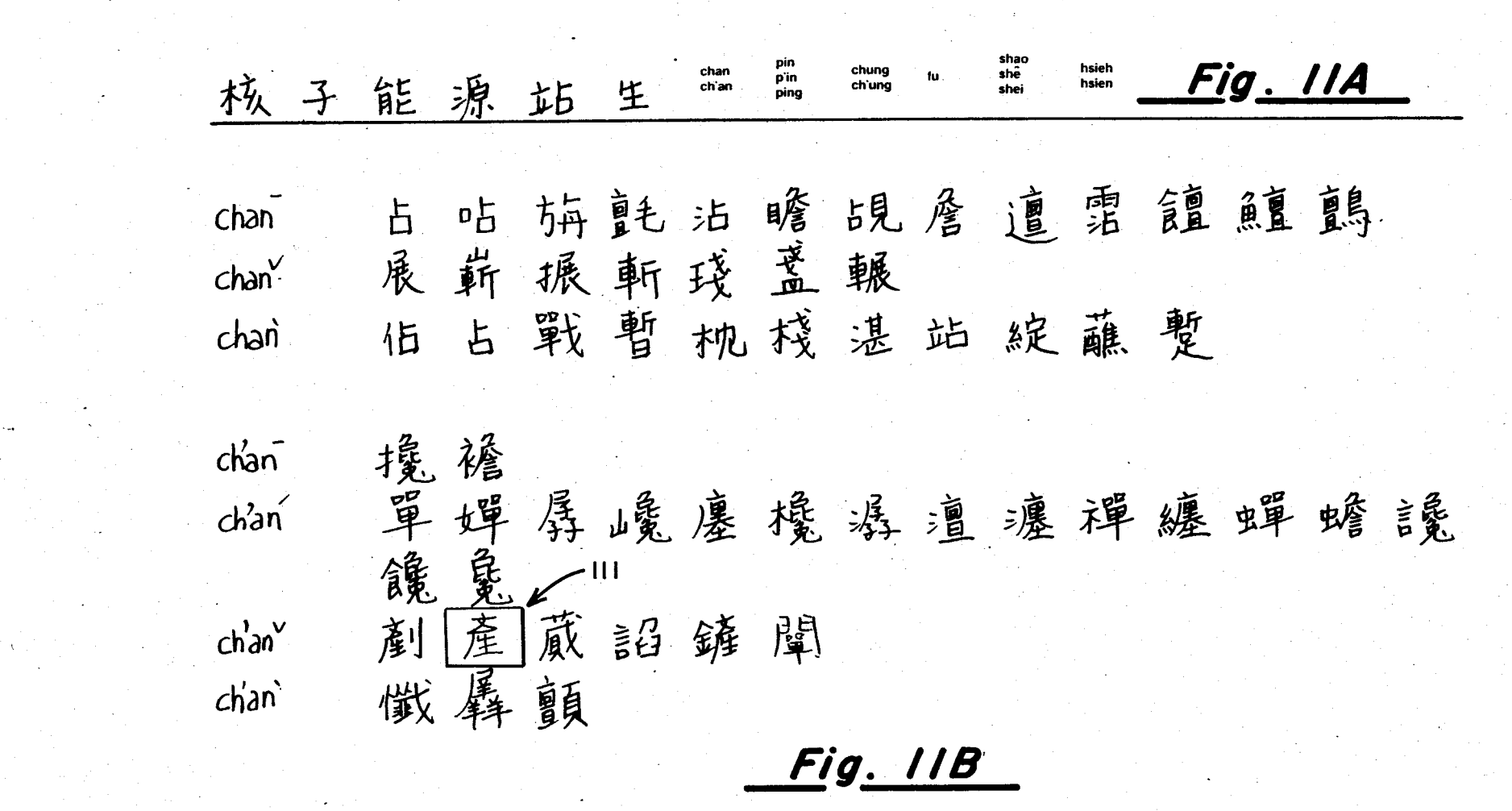
Figures 14A, 14B:
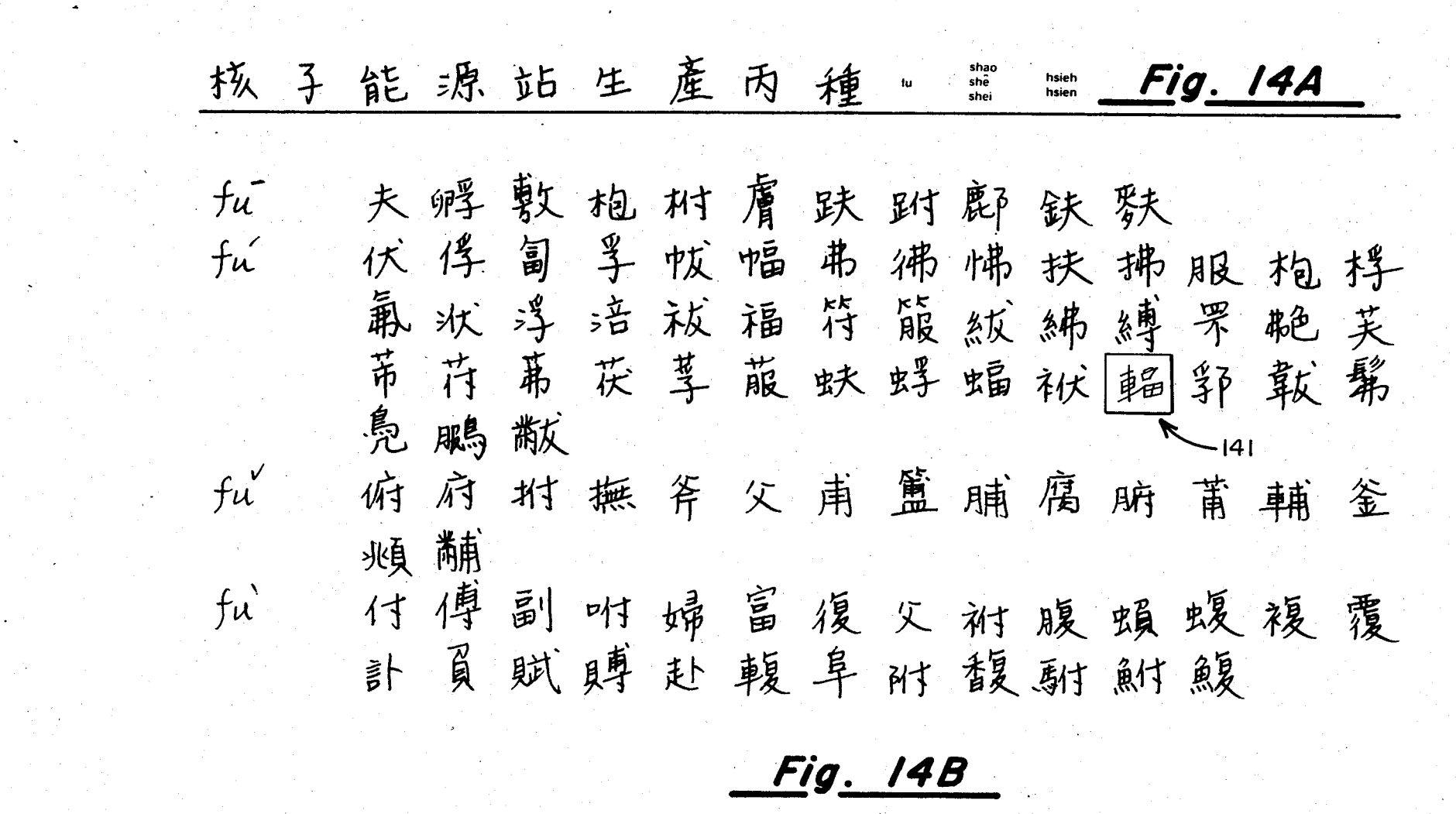
Figures 16A, 16B:
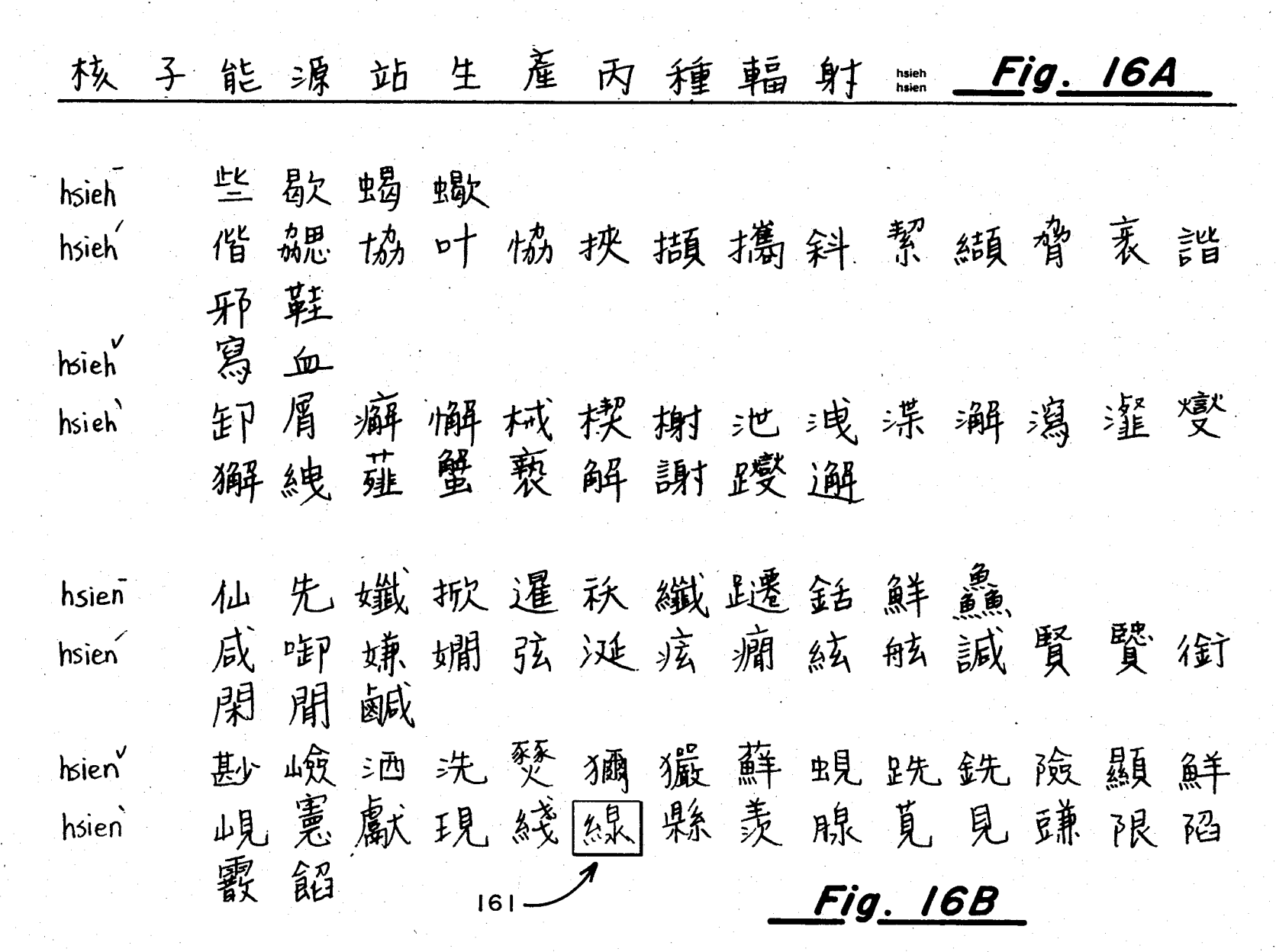

| Phonetic Sound | Sound Location FIG. 3B-1 & 3B-2 | Intonation | Character Location |
| --- | --- | --- | --- |
| chan | 90 | FIG. 11B | 111 |
| ping | 120 | FIG. 12B | 121 |
| chung | 130 | FIG. 13B | 131 |
| fu | 140 | FIG. 14B | 141 |
| she | 150 | FIG. 15B | 151 |
| hsien | 160 | FIG. 16B | 161 |

When the final Chinese character has been selected to substitute for the final phonetic sound of FIG. 16A, the entire Chinese character representation of the sentence "nuclear power stations generate gamma radiation" has been constructed. This sentence in Chinese characters may be displayed on CRT display 20, or may be stored in memory, either in the disk drive 24 or in the system memory 12, or may be printed out by printer 22. In any event, it can be seen that the method of constructing the Chinese character into an orderly sentence having meaning is a repetitive series of simple steps which can be readily accomplished by an operator having the skills in the phonetic sounds and in the Chinese language.

Figure 4A:
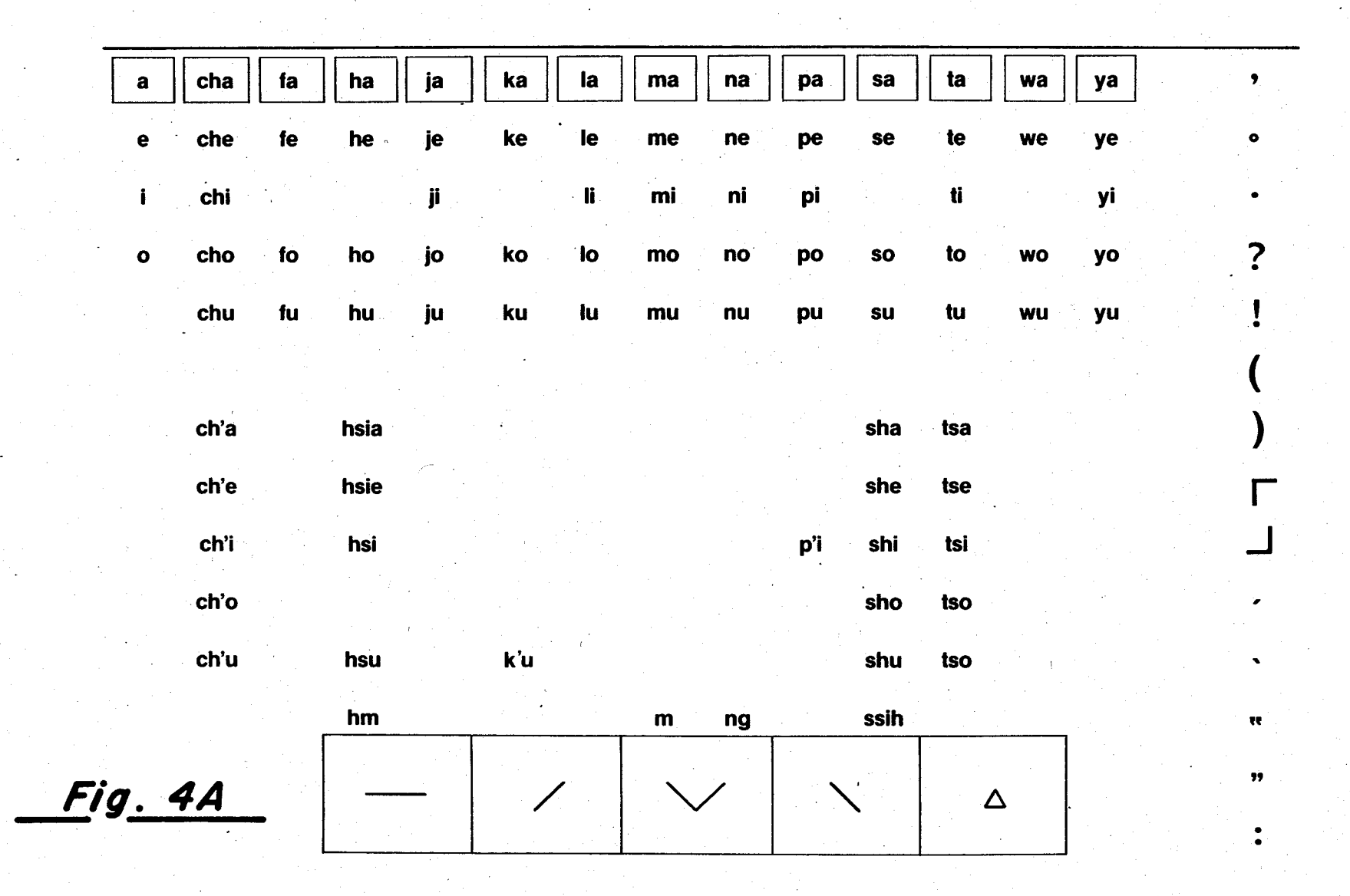

It should be noted that other forms of phonetic tables may be utilized in the practice of the invention. For example, FIG. 4A shows a simplified table in the Chinese language, utilizing abbreviations of phonetic sounds in Roman characters. In using this table, the operator selects the abbreviated form of a sound representation, and completes the selection by selecting the intonation desired by touching one of the five intonation symbols shown along the bottom of FIG. 4A. This results in a further display of all sounds beginning with the selected letters and having the intonation desired. The further process of selecting the specific Chinese characters proceeds in the manner described above.

Figure 4B:
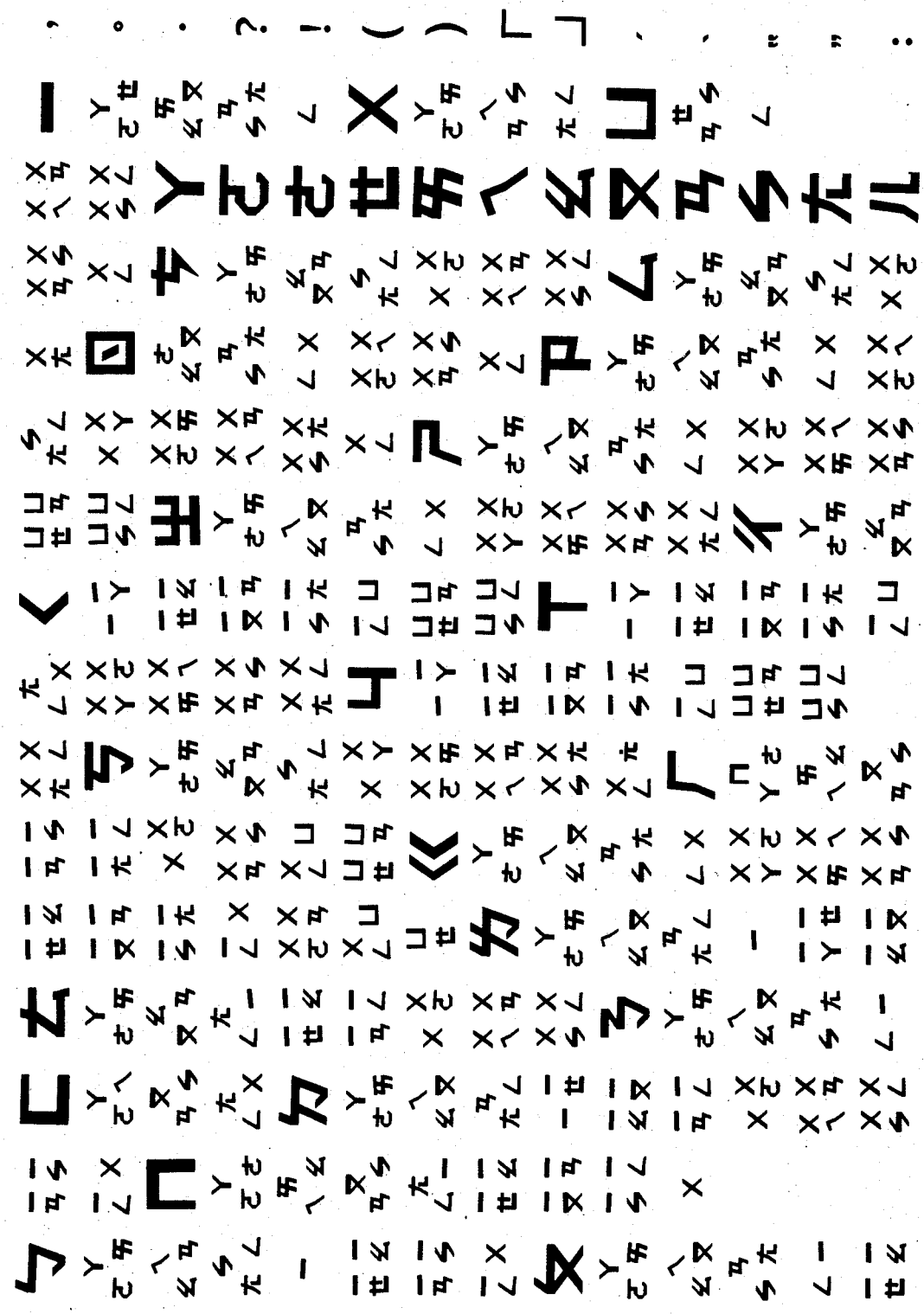
FIG. 4B shows a phonetic table of the Chinese language in p-p'-m-f form.

A method that may be practiced utilizing phonetic tables in languages and character representations other than Roman characters, is shown in FIG. 4B. FIG. 4B shows a phonetic table which is known as "po bo mo fo", after the first four sounds in the table sequence. In FIG. 4B the various phonetic sounds are placed in groupings similar to those shown in FIG. 3B, and an operator who has an understanding of this method of representing sounds may equally use the phonetic table of FIG. 4B for implementing the method.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of selecting language characters from a plurality of prestored groups of language characters arranged according to the phonetic sound and intonation of the language characters, comprising the steps of:
   (a) displaying a first group of symbols representative of the phonetic sounds of said characters, arranged according to a phonetic alphabet;
   (b) selecting from said first group at least one of said symbols representative of the phonetic sound of a desired character;
   (c) displaying a second group of symbols representative of the intonations of the selected symbols of said first group, and displaying the language characters associated with the symbols representative of intonations;
   (d) selecting, from the displayed language characters, the desired language character; and
   (e) reproducing the selected desired language character.

2. The method of claim 1, further comprising the step of reproducing the desired character in printed form.

3. A method of constructing sentences of pictorial language characters from phonetic representations of the pictorial language, and from groups of pictorial language characters arranged according to language intonations of the phonetic representations, comprising the steps of:
   (a) displaying phonetic symbols as phonetic representations of the pictorial language in a plurality of groups;
   (b) selecting a desired phonetic symbol group as a preliminary representation of a desired pictorial language character;
   (c) displaying pictorial character representations of the plurality of language intonations associated with the selected phonetic symbol group;
   (d) selecting a desired pictorial character representation from the displayed character representations;
   (e) reproducing the selected desired pictorial character representation; and
   (f) repeating steps (a)-(e) until the desired sentence has been constructed of pictorial language characters.

4. The method of claim 3, wherein the steps of displaying further comprise displaying on a visual screen.

5. The method of claim 4, wherein the steps of selecting further comprise closing an electrical switching circuit uniquely associated with the desired symbol.

6. The method of claim 5, wherein the step of reproducing further comprises copying the desired character in reproduced form onto a media different from the displayed media.

7. The method of claim 6, wherein the steps of selecting by closing an electrical switching circuit further comprise depressing a unique location on a touch panel overlay of the displaying symbols.

8. The method of claim 7, further comprising the step of reproducing the entire selected pictorial language sentence in printed form.

9. The method of claim 8, wherein the step of reproducing further comprises selecting from a 24 by 24 matrix of printable dot positions only those dot positions which visually form the displayed desired character, and repeating same for all characters in the selected pictorial language sentence.

10. A method of printing pictorial language characters by processing phonetic symbol representations of the pictorial language and language chraracters grouped according to language intonations of the phonetic symbol representations in a computer and visual display screen system, comprising the steps of
    (a) displaying a phonetic table representation of the pictorial language on a visual display screen;
    (b) selecting one of the desired phonetic representations on the visual display screen by closing an electrical switching circuit which is programmably variable but physically and uniquely associated with the displayed desired phonetic representation;
    (c) selecting the group of language characters grouped according to language intonations of the selected phonetic representation;
    (d) displaying on the visual display screen the pictorial language characters representative of the language intonations of the selected phonetic representation;
    (e) selecting the desired pictorial language character by closing an electrical switching circuit uniquely associated with the displayed desired character; and
    (f) printing the selected pictorial character 11. The method of claim 10, further comprising the preliminary step of storing in a retrievable memory representations of all desired pictorial language characters.

12. The method of claim 10, wherein the step of printing further comprises selecting from a 24 by 24 matrix of printable dot positions only those dot positions which visually form the displayed desired character.

13. A method of constructing sentences of pictorial language characters from phonetic representations of the pictorial language, and from groups of pictorial language characters arranged according to language intonations, each such group being associated with a phonetic representation, comprising the steps of:
 (a) displaying phonetic symbols as phonetic representations of the pictorial language in a plurality of groups;
 (b) selecting a desired phonetic symbol group as representative of at least a portion of a desired pictorial language sentence;
 (c) selecting the group of pictorial language characters arranged according to language intonations, associated with the selected phonetic symbol group;
 (d) displaying pictorial character representations of the plurality of language intonations associated with the selected phonetic symbol group;
 (e) selecting a desired pictorial character representation from the displayed character representations;
 (f) reproducing the selected desired pictorial character representation; and
 (g) repeating steps (a)-(f) until the desired sentence has been constructed of pictorial language characters.

14. The method of claim 13, wherein the steps of displaying further comprise displaying on a visual screen.

15. The method of claim 14, wherein the steps of selecting further comprise closing an electrical switching circuit uniquely associated with the desired symbol.

16. The method of claim 15, wherein the step of reproducing further comprises copying the desired character in reproduced form onto a media different from the displayed media.

17. The method of claim 16, wherein the steps of selecting by closing an electrical switching circuit further comprise depressing a unique location on a touch panel overlay of the displaying symbols.

18. The method of claim 17, further comprising the step of reproducing the entire selected pictorial language sentence in printed form.

19. A method of printing pictorial language characters by processing phonetic symbol representations and language intonations of the pictorial language in a computer and visual display screen system, comprising the steps of
 (a) displaying a phonetic table representation of the pictorial language on a visual display screen;
 (b) selecting all of the desired phonetic representations on the visual display screen by closing an electrical switching circuit which is physically and uniquely associated with each of the displayed desired phonetic representations;
 (c) sequentially displaying on the visual display screen a plurality of pictorial language characters representative of the language intonations of each of the selected phonetic representations;
 (d) selecting all of the desired pictorial language characters by closing electrical switching circuits uniquely associated with each of the displayed desired characters; and
 (e) printing the selected pictorial characters.

20. The method of claim 10, further comprising the preliminary step of storing in a retrievable memory representations of all desired pictorial language characters.

21. The method of claim 19, wherein the step of printing further comprises selecting from a 24 by 24 matrix of printable dot positions only those dot positions which visually form each of the displayed desired characters, and repeating same for all characters in the selected pictorial language sentence.

* * * * *

UNITED STATES PATENT AND TRADEMARK OFFICE
CERTIFICATE OF CORRECTION

PATENT NO. : 4,698,758

DATED : October 6, 1987

INVENTOR(S) : Theodore E. Larsen

It is certified that error appears in the above-identified patent and that said Letters Patent is hereby corrected as shown below:

In claim 10, column 12, line 38, "chraracters" should be -- characters --.

In claim 20, column 14, line 28, "claim 10" should be -- claim 19 --.

Signed and Sealed this

Twenty-second Day of March, 1988

Attest:

DONALD J. QUIGG

Attesting Officer

Commissioner of Patents and Trademarks